UNITED STATES PATENT OFFICE.

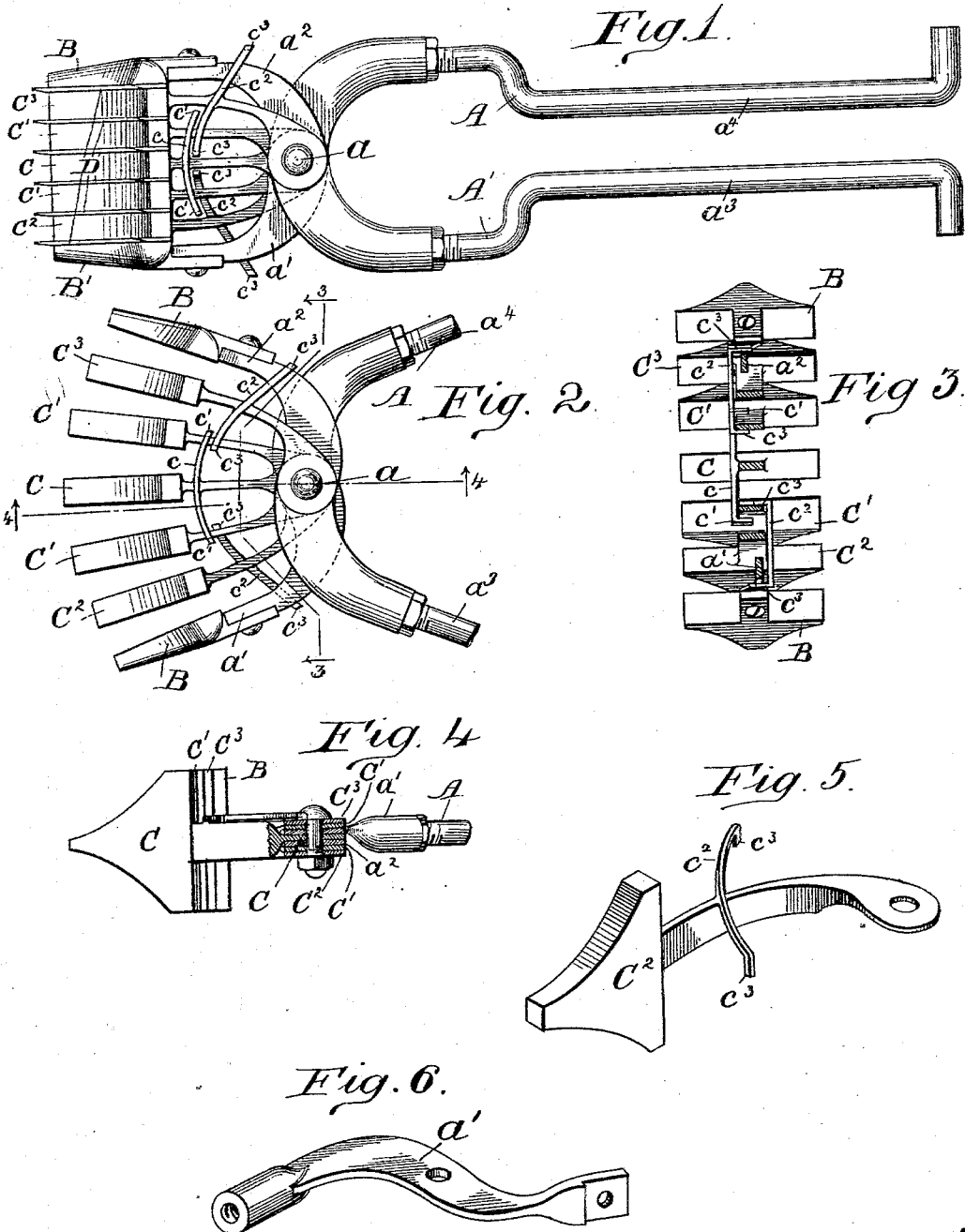

JOHN F. STEWARD, OF CHICAGO, ILLINOIS.

MULTIPLE TONGS.

SPECIFICATION forming part of Letters Patent No. 561,831, dated June 9, 1896.

Application filed April 13, 1896. Serial No. 587,307. (No model.)

*To all whom it may concern:*

Be it known that I, JOHN F. STEWARD, of Chicago, in the county of Cook and State of Illinois, have invented certain new and useful Improvements in Multiple Tongs for Tempering Mowing-Machine Sections, of which the following is a full description, reference being had to the accompanying drawings, in which—

Figure 1 is a plan view showing the tongs closed. Fig. 2 is a plan view showing them opened. Fig. 3 is a section on the line 3 3 of Fig. 2. Fig. 4 is a section on the line 4 4 of Fig. 2. Fig. 5 is a perspective view of one of the intermediate fingers, and Fig. 6 is a perspective view of one of the hand-levers.

The hand-levers A and A' are pivoted upon the bolt $a$ and have secured thereto at the ends $a'$ and $a^2$ the outer tong-fingers B and B'. The hand-levers are preferably of two parts—the ends $a'$ and $a^2$ and the handles $a^3$ and $a^4$. The end pieces $a'$ and $a^2$ are preferably alike and can be made from the same pattern and are pivoted back to back or in reversed positions.

Intermediate tong-fingers of any desired number and form having shanks whereby each is pivoted upon the pivot-bolt $a$ are situated between the fingers B and B'. The center tong-finger C has a lateral extension $c$, having hooks $c'$ at each end, and is pivoted, preferably, between the hand-levers. The fingers $C^2$ and $C^3$ are preferably alike and have lateral extensions $c^2$, similar to that upon the finger C', which are also furnished with hooks $c^3$ at both ends. In the drawings the fingers $C^2$ and $C^3$ are shown as being from the same pattern, one pivoted above and the other below the parts $a'$ and $a^2$ of the hand-levers and having their opposite sides uppermost.

The fingers C' are on each side of the center finger C and between it and those $C^2$ and $C^3$. They are also pairs—that is, exactly alike—and are shown as having their opposite sides uppermost. As described, it will be understood that the arrangement of the fingers is such that when closed, as shown in Fig. 1, they will not strike each other. When the tongs are opened from the position shown in Fig. 1 to that shown in Fig. 2, the outer hooks upon the extensions of the fingers $C^2$ and $C^3$ are struck by the forward extensions $a'$ and $a^2$ of the handles, and the said fingers are moved outwardly. When moved a certain distance, the inner hooks on said fingers strike the fingers C' and cause them to be moved outwardly until they in turn strike the hooks upon the lateral extension of the finger C'. The last-named finger may be said to be maintained in the position it holds when the tongs are closed, and the fingers between the center finger C' and the outer ones B and B' are made to assume positions a regular distance apart.

Referring to Fig. 1, D are sections grasped between the fingers.

What I claim as my invention, and desire to secure by Letters Patent, is—

1. In multiple tongs the combination with hand-levers having outer tong-fingers secured thereto, of a series of fingers pivoted upon the pivot-bolt of said hand-levers, each of said fingers suitably connected to its outside neighboring finger whereby each finger is drawn away from its inside neighboring finger by the outward movement of its outside neighboring finger, substantially as and for the purpose described.

2. In multiple tongs, the combination of hand-levers, outer tong-fingers, as one piece therewith, intermediate tong-fingers pivoted upon the axis of said hand-levers and lateral extensions as one part with said intermediate fingers and having hooks at their extremities whereby the said intermediate fingers are caused to move apart when the hand-levers move apart, substantially as described.

3. The combination in multiple tongs of hand-levers having outer tong-fingers as one part therewith, intermediate tong-fingers pivoted upon the axis of said hand-levers and every alternate finger having lateral extensions whereby the neighboring fingers are engaged when the tongs are opened, substantially as described.

JOHN F. STEWARD.

Witnesses:
ARTHUR JOHNSON,
CHAS. A. STEWARD.